United States Patent
Mamoni et al.

(10) Patent No.: US 11,803,842 B2
(45) Date of Patent: Oct. 31, 2023

(54) SYSTEM AND METHOD FOR AUTHENTICATING DIGITAL TRANSACTION BY IMPLEMENTING MULTI-PARTY COMPUTATION PROTOCOL

(71) Applicant: KNABU DISTRIBUTED SYSTEMS LTD, London (GB)

(72) Inventors: Hakim Mamoni, London (GB); Gabrielle Maureen Patrick, London (GB)

(*) Notice: Subject to any disclaimer, the term of this patent is extended or adjusted under 35 U.S.C. 154(b) by 0 days.

(21) Appl. No.: 17/351,443

(22) Filed: Jun. 18, 2021

(65) Prior Publication Data
US 2022/0405746 A1     Dec. 22, 2022

(51) Int. Cl.
G06Q 20/38     (2012.01)
H04L 9/08     (2006.01)
G06Q 20/40     (2012.01)
H04L 9/00     (2022.01)

(52) U.S. Cl.
CPC ..... *G06Q 20/3825* (2013.01); *G06Q 20/3827* (2013.01); *G06Q 20/405* (2013.01); *H04L 9/085* (2013.01); *H04L 9/50* (2022.05); *H04L 2209/56* (2013.01)

(58) Field of Classification Search
None
See application file for complete search history.

(56) References Cited

U.S. PATENT DOCUMENTS

| | | | |
|---|---|---|---|
| 2020/0153640 A1* | 5/2020 | Ranellucci | H04L 9/088 |
| 2020/0259638 A1* | 8/2020 | Carmignani | H04L 9/50 |
| 2020/0287874 A1* | 9/2020 | Bertram | G06F 21/645 |
| 2020/0359207 A1* | 11/2020 | Lee | H04L 9/085 |
| 2022/0051240 A1* | 2/2022 | Shamai | H04L 9/3239 |
| 2022/0231855 A1* | 7/2022 | Kunz | H04L 9/3236 |

OTHER PUBLICATIONS

"A beginner's guide to Shamir's Secret Sharing, Keyless Technologies, Mar. 7, 2020" (Year: 2020).*
"What is Secure Multi-Party Computation, Multi Party Computation, Mar. 19, 2020" (Year: 2020).*

* cited by examiner

*Primary Examiner* — Kito R Robinson
*Assistant Examiner* — Toan Duc Bui
(74) *Attorney, Agent, or Firm* — RC Trademark Company

(57) ABSTRACT

Disclosed is a system (100, 200) for authenticating a digital transaction by implementing a multi-party computation protocol. The system comprises a first set of first nodes (102) configured to generate a first data (104), wherein each of the first nodes, from the first set of first nodes, in a second set of first nodes (102A) is an independent party and a server arrangement (106) communicably coupled with the first set of first nodes. The server arrangement is configured to receive the first data from the first set of first nodes, generate a second data (108), verify whether a number of other of the first nodes (102B) not in the second set of first nodes is equal to or at most only one greater than a number of first nodes in the second set of first nodes and authenticate the digital transaction based on the verification, using the secret shares in the first data and the second data.

11 Claims, 2 Drawing Sheets

SYSTEM AND METHOD FOR AUTHENTICATING DIGITAL TRANSACTION BY IMPLEMENTING MULTI-PARTY COMPUTATION PROTOCOL

TECHNICAL FIELD

The present disclosure relates to cryptography and digital signing processes; and more specifically to systems and methods for authenticating a digital transaction by implementing a multi-party computation protocol.

BACKGROUND

In recent times, the adoption of digital assets and, in particular, digital currencies secured by cryptography ("cryptocurrencies"), has grown exponentially. With this exponential growth in use of digital currencies, interest in the underlying technologies used to provide these currencies has also grown significantly. For example, Bitcoin is a crypto-currency that utilizes blockchains to record transactions involving transfers of Bitcoin currency. By using blockchains, transactions may be recorded without relying on a centralized banking system, thereby ensuring that the records are not lost in the event of hacking a single system or insolvency of the owner of the banking system. Further, as a result of the increased interest in blockchain technology, various new possible uses for blockchain have been devised. These uses include, but are not limited to, recording exchanges of goods, securely recording medical and other non-business data, "smart" contracts including code to be executed when certain conditions are met and recorded on a blockchain, and many more. Each use requires a different protocol to meet its unique requirements.

Conventionally, multi-party computation involving two independent parties i.e. the customer entity and the solution provider entity employ the multi-signature scheme i.e. a digital signature scheme which allows a group of parties to sign a single document (or data). Usually, a multi-signature algorithm produces a joint signature that is more compact than a collection of distinct signatures from all parties. In crypto-currency, for instance, a multi-signature refers to requiring more than one key to authorize a crypto-currency transaction. A transaction statement can only be issued by an entity proving the current ownership of these units. In some cases, the basic system of crypto-currency (such as a Bitcoin) provides very limited means to control, overrule, or approve a transaction. Hence the lack of authority may limit the utilization of crypto-currency in complex transactions wherein multiple participants (more than two parties) are involved. Furthermore, in some cases, crypto-currency may be the best candidate for digital transaction wherein tracking the transaction does not require keeping each transaction in the book. Yet, in the modern world of the internet, securing financial transactions is required in order to control the transactions and the authorization rules.

For MPC systems to be truly secure, available and resilient at least three nodes or parties are required to be involved in the computations with a threshold of a single node being permitted to become unavailable or corrupted. Typically, security and resilience problems arise when only two independent parties are involved in a 2-of-3 MPC system and one of the parties (generally, the intermediary such as customer entity) is configured to run two of the three nodes in the MPC system. In the event the party running the two nodes becomes unavailable and/or corrupted, the MPC system can become unavailable or worse hijacked that may cause a loss of data, a loss of access to funds, or a loss of funds in cases of securing blockchain transactions Although blockchain offers various advantages with respect to security and stability, the technology still faces challenges that may undermine these advantages. Entities that maintain large amounts of crypto assets may be prime targets for attackers. Specifically, server breaches, application vulnerabilities, cloud account takeovers, and protocol vulnerabilities, present opportunities for attackers. Notably, the challenges described above are even more significant when the entity owning the secret key (or private key) is not the entity using the secret key. For example, in businesses (as opposed to the consumer use-case), the business owns the private key and the underlying assets, while the employees are the entities performing the transactions.

Therefore, in light of the foregoing discussion, there exists a need to overcome the aforementioned drawbacks and provide an improved system or method for authenticating a digital transaction.

SUMMARY

The present disclosure seeks to provide a system and a method for authenticating a digital transaction by implementing a multi-party computation protocol. An aim of the present disclosure is to provide a solution that overcomes at least partially the problems encountered in prior art.

In one aspect, an embodiment of the present disclosure provides a system for authenticating a digital transaction by implementing a multi-party computation protocol, the system comprising:

a first set of first nodes configured to generate a first data, wherein the first data comprises a secret share of a plurality of secret shares provided by each of the first nodes in the first set of first nodes, and wherein each of the first nodes, from the first set of first nodes, in a second set of first nodes is an independent party; and a server arrangement communicably coupled with the first set of first nodes, wherein the server arrangement is configured to:
  receive the first data from the first set of first nodes;
  generate a second data, wherein the second data comprises a secret share of the plurality of secret shares;
  verify whether a number of other of the first nodes not in the second set of first nodes is equal to or at most only one greater than a number of first nodes in the second set of first nodes; and
  authenticate the digital transaction based on the verification, using the secret shares in the first data and the second data.

In another aspect, an embodiment of the present disclosure provides a method for authenticating a digital transaction by implementing a multi-party computation protocol, the method comprising:

providing a first set of first nodes configured to generate a first data, wherein the first data comprises a secret share of a plurality of secret shares provided by each of the first nodes in the first set of first nodes, and wherein each of the first nodes, from the first set of first nodes, in a second set of first nodes is an independent party; and providing a server arrangement communicably coupled with the first set of first nodes;

receiving, by the server arrangement, the first data from the first set of first nodes;

generating, by the server arrangement, a second data, wherein the second data comprises a secret share of the plurality of secret shares;

verifying, by the server arrangement, whether a number of other of the first nodes not in the second set of first nodes is equal to or at most only one greater than a number of first nodes in the second set of first nodes; and authenticating, by the server arrangement, the digital transaction based on the verification, using the secret shares in the first data and the second data.

Embodiments of the present disclosure substantially eliminate or at least partially address the aforementioned problems in the prior art and enable the system or method to authenticate a digital transaction by implementing a multi-party computation protocol.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
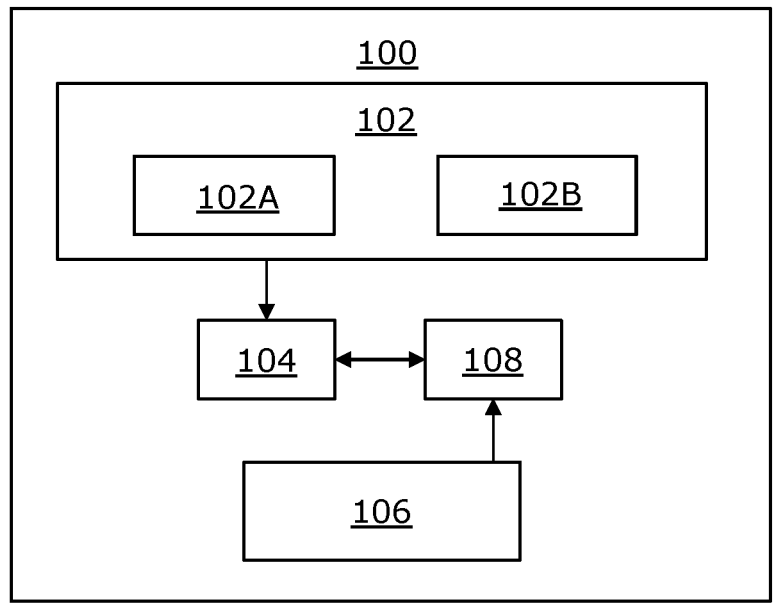
FIG. 1 is a block diagram of a system for authenticating a digital transaction by implementing a multi-party computation protocol, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In an aspect, an embodiment of the present disclosure provides A system for authenticating a digital transaction by implementing a multi-party computation protocol, the system comprising:

a first set of first nodes configured to generate a first data, wherein the first data comprises a secret share of a plurality of secret shares provided by each of the first nodes in the first set of first nodes, and wherein each of the first nodes, from the first set of first nodes, in a second set of first nodes is an independent party; and a server arrangement communicably coupled with the first set of first nodes, wherein the server arrangement is configured to:
  receive the first data from the first set of first nodes;
  generate a second data, wherein the second data comprises a secret share of the plurality of secret shares;
  verify whether a number of other of the first nodes not in the second set of first nodes is equal to or at most only one greater than a number of first nodes in the second set of first nodes; and
  authenticate the digital transaction based on the verification, using the secret shares in the first data and the second data.

In another aspect, the present disclosure provides a method for authenticating a digital transaction by implementing a multi-party computation protocol, the method comprising:

providing a first set of first nodes configured to generate a first data, wherein the first data comprises a secret share of a plurality of secret shares provided by each of the first nodes in the first set of first nodes, and wherein each of the first nodes, from the first set of first nodes, in a second set of first nodes is an independent party; and providing a server arrangement communicably coupled with the first set of first nodes;

receiving, by the server arrangement, the first data from the first set of first nodes;

generating, by the server arrangement, a second data, wherein the second data comprises a secret share of the plurality of secret shares;

verifying, by the server arrangement, whether a number of other of the first nodes not in the second set of first nodes is equal to or at most only one greater than a number of first nodes in the second set of first nodes; and authenticating, by the server arrangement, the digital transaction based on the verification, using the secret shares in the first data and the second data.

The present disclosure provides a system for authenticating a digital transaction by implementing a multi-party computation (MPC) protocol, in accordance with an embodiment of the present disclosure. The term "multi-party computation protocol" refers to a method or protocol for two or more computing devices (or systems) to jointly compute a function based on their respective inputs while keeping the inputs private or encrypted. The term "digital transaction" refers to a unit of work performed within a system against any data and treated in a coherent and reliable way independent of other data transactions. The digital transaction generally represents any change in the data or data sets. In an exemplary scenario, the digital transaction represents an event occurring with respect to a blockchain such as, but not limited to, transfer of currency, recording of a transfer of a good, addition of an entry in a record, and the like. Herein, the digital transaction is authenticated based on at least a verification via an intermediary between at least two or more device. It may be contemplated by a person skilled in the art that the digital transaction may be approved beforehand by an approval server or the like, before being authenticated as herein. Generally, on account of the number of security challenges related to digital transactions, novel solutions for authenticating a digital transaction are required.

Typically, securing private keys for authentication is difficult for each entity or node seeking digital authentication services. In particular, the private keys present a single point of failure, wherein if the private key is lost or stolen, the loss may cause issues such as, but not limited to, loss of access (e.g., to Bitcoin funds) or theft by malicious entities. Further, if the entities or nodes responsible for authentication are compromised, the authentication system becomes prone to theft of digital assets without getting access to the private keys, i.e. via directly requesting authentication module or node or system (such as a hardware authentication module) to authenticate a digital transaction to user's wallet. Furthermore, existing solutions currently involve one or two independent parties (or companies) at the most for authentication including the customer and the solution provider (or intermediary) and thus, system failure and compromise remains a possibility. Thus, to eliminate or at least partially resolve the existing problems, the present disclosure provides the system for authenticating the digital transaction by implementing the multi-party computation protocol, wherein the system distributes computational responsibilities to the two or more independent parties involved in the MPC protocol.

The system comprises a first set of first nodes configured to generate a first data. The term "node" refers to any active, physical and/or electronic device configured to generate the first data. Typically, the node comprises software, hardware and/or firmware elements for at least generating the first data. In an example, the node of the first set of first nodes comprises a memory for storing the first data and a data communication interface for communicating the first data to a server arrangement. Optionally, the first nodes comprises software modules, namely an encryption module for encrypting the first data prior to transmission and a decryption module for decrypting the first data. Examples of nodes include, but is not limited to, desktop computer, portable computer or laptop, mainframe computer, supercomputer, mobile phones and/or smart phones, smart watches, smart glasses, tablet computers, personal digital/data assistants (PDA), hand-held devices, bridges, switches, hubs, modems and servers network appliances, Internet appliances, wearable embedded devices, or any other computation device and the like. In the present system, the first nodes represent companies which may be responsible for authenticating the transactions in the MPC protocol.

Herein, the first data comprises a secret share of a plurality of secret shares generated by each of the first nodes in the first set of first nodes. The first set of first nodes follow a secret sharing (also called secret splitting) method, wherein the first set of first nodes are configured to generate the first data comprising the secret share of the plurality of secret shares. Typically, the secret share represents a portion of the plurality of secret shares, wherein the secret may be reconstructed only when a sufficient or threshold number (of possibly different types) of secret shares are combined together. Notably, individual secret shares of independent nodes are of no use on their own. Herein, the first set of first nodes are configured to generate the secret share or the secret share is optionally provided by the server arrangement. Typically, a minimum or threshold number of participating nodes or secret shares are required together to reconstruct the secret share, and fewer secret shares than the threshold number of secret shares would render the secret share unusable.

The system comprises a server arrangement communicably coupled with the first set of first nodes. Optionally, the server arrangement is communicably coupled with the first set of first nodes using a communication network. The server arrangement includes at least a server configured to control the implementation of the multi-party computation protocol for authenticating the digital transaction. The term "server arrangement" refers to a structure and/or module that include programmable and/or non-programmable components configured to store, process and/or share information related to the one or more digital transactions. Optionally, the server arrangement includes any arrangement of physical or virtual computational entities capable of enhancing information to perform various computational tasks. Furthermore, it will be appreciated that the server arrangement may be implemented as a hardware server and/or plurality of hardware servers operating in a parallel or in a distributed architecture. Optionally, the servers in the server arrangement are supplemented with additional computation methods, such as neural networks, and hierarchical clusters of pseudo-analog variable state machines implementing artificial intelligence algorithms. In an example, the server arrangement may include components such as a memory, a processor, a data communication interface, a network adapter and the like, to store, process and/or share information with other computing devices, such as the first set of first nodes. Optionally, the server arrangement is implemented as a computer program that provides various services (such as database service) to other devices, modules or apparatus. Moreover, the server arrangement refers to a computational element that is operable to respond to and processes instructions to authenticate the digital transactions. Optionally, the server arrangement includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit, for example as aforementioned. Additionally, the server arrangement is arranged in various architectures for responding to and processing the instructions for authenticating the digital transaction.

The server arrangement is configured to receive the first data from the first set of first nodes. Upon generation of the first data by the first set of first nodes, the first set of first nodes transmit the first data to the server arrangement for further operation. Typically, the secret share of the plurality of secret shares corresponding to the first data is received for authenticating the digital transaction.

The server arrangement is configured to generate a second data, wherein the second data comprises a secret share of the plurality of secret shares. The server arrangement upon receiving the first data from the first set of first nodes, is configured to generate the second data. Typically, the second data comprises the secret share of the plurality of secret shares (i.e. different from the secret share of the first data), wherein the secret share represents another portion of the plurality of secret shares required for authentication of the digital transaction.

The server arrangement is configured to authenticate the digital transaction based on the verification, using the secret shares in the first data and the second data. Upon successful verification by the server arrangement, the server arrangement is configured to authenticate the digital transaction using the secret shares obtained from the first data and the second data. Typically, the server arrangement combines the secret shares of the first data and the second data together to form a complete secret share required for authenticating the digital transaction.

As discussed, the MPC protocol allows the two or more parties (or nodes) to jointly compute a function over their respective inputs while keeping those inputs private. Thus, utilizing MPC protocol for the authentication of the digital transaction allows for creating the secret shares privately and independently by each participating party while ensuring that the secret shares collectively enable authenticating transactions without revealing the secret keys that corresponds to the collective secret shares.

In the implementation of the MPC protocol as per the present system, the server arrangement is an independent party. In particular, the server arrangement may be a company or a regulatory body responsible for providing, maintaining and/or implementing the MPC protocol. Generally, the first set of first nodes represent independent parties involved in the multiparty computation protocol, however it may be possible that some of first nodes in the first set of first nodes may be non-independent parties.

In the present system, the first set of first nodes comprises a second set of first nodes, wherein each of the first nodes in the second set of first nodes is an independent party. Herein, the second set of first nodes represent parties or companies participating in the MPC protocol which are ensured to be independent parties, like, and in addition, to the server arrangement, for authenticating the digital transaction.

The server arrangement is configured to verify whether a number of other of the first nodes not in the second set of first nodes is equal to or at most only one greater than a number of first nodes in the second set of first nodes. Herein, the first nodes comprise two distinct nodes, namely the first nodes in the second set of first nodes and other of the first nodes not in the second set of first nodes. Herein, the first nodes in the second set of first nodes are ensured to be independent parties. It may be possible that the other of the first nodes not in the second set of first nodes may represent non-independent parties involved in the digital transaction. Thus, the server arrangement verifies whether the number of other of the first nodes not in the second set of first nodes is equal to or at most only one greater than the number of first nodes in the second set of first nodes. The verification is done to ensure that the number of independent parties are equal or at least one more than the number of possibly non-independent parties. With this arrangement, and with the server arrangement always being the independent node, the total number of possible non-independent nodes cannot exceed the total number of independent nodes in the present system. Since in any blockchain application, a consensus of more than half of the participating nodes is required, thus by ensuring that the number of independent nodes or parties are greater than the number of non-independent nodes or parties, the non-independent parties, even if they collude together, will not be able to authenticate the transaction on their own. Such an implementation enables the system to be secure, reliable and prevents any possible compromise in the system.

In an embodiment, wherein when the server arrangement verifies that the number of other of the first nodes not in the second set of first nodes is at most one greater than the number of first nodes in the second set of first nodes, and the secret shares provided by the other of the first nodes not in the second set of first nodes provides a different indication for authentication from the secret shares provided by the first nodes in the second set of first nodes, the server arrangement is configured to authenticate the digital transaction using the secret share in the second data. That is, in case, for example, when the ensured independent nodes, including the first nodes in the second set of first nodes and the server arrangement provide that the digital transaction shall not be authenticated (for some reason), and possibly non-independent nodes including other of the first nodes not in the second set of first nodes may provide that the digital transaction shall be authenticated (for some reason); in such case, the server arrangement may override the authentication process and the digital transaction would not be authenticated.

In an embodiment, the system further comprises a second node configured to generate a third data, wherein the third data comprises a secret share of the plurality of secret shares. That is, apart from the first set of first nodes and the server arrangement, the system further comprises the second node. Herein, the second node may represent a customer node requesting authentication of the digital transaction, which can be assumed to be an independent party for the purposes of the present disclosure. In the present system, the second node is also implemented for authentication of the digital transaction. Notably, the customer node or the second node is configured to generate the third data comprising the secret share of the plurality of secret shares, required for authenticating the digital transaction.

In an embodiment, the server arrangement is configured to authenticate the digital transaction based on the verification, using the secret shares in the first data, the second data and the third data. That is, in scenarios, wherein the second node or the customer node is also involved in the MPC protocol, the server arrangement is configured to use the secret shares in the first data, the second data and the third data to authenticate the digital transaction. This is helpful in scenario when the total number of ensured independent nodes, i.e. the first nodes in the second set of first nodes and the server arrangement, may be equal to the possibly non-independent nodes, i.e. other of the first nodes not in the second set of first nodes; as, herein, the third data from the second node can be used for authenticating the transaction.

In an embodiment, when the system also utilizes the second node for authentication of the digital transaction, the first set of first nodes comprises a single first node. In other words, only a single first node may be participating in the multi-party computation protocol for authenticating the digital transaction, as with the addition of the second node and presence of the server arrangement (which also acts as a node), the minimum number of the nodes required for authenticating the digital transaction in the MPC protocol are achieved.

In an embodiment, the secret share of the plurality of secret shares is a partial signature. The partial signature represents a form of encryption, wherein a signer (such as a node from the first set of first nodes), given a message or function, may compute a corresponding secret share configured to preserve the node anonymity. Further, at a later instance, the partial signature may be completed to a full and verifiable signature using a secret key (public or private) of the node. It may be appreciated by a person skilled in the art that the secret share (or the partial signature) may not be actually shared, but only be used in the signing process. Typically, the partial signature provides anonymity, unambiguity and unforgeability to the system for authenticating the digital transaction. The partial signature is a digital signature i.e. a set of algorithms and encryption protocols utilized to verify the authenticity of any data or message. Each entity's identity is determined by the public key of a private/public key-pair, wherein only the owner of the private key can sign the data or message enabling the authentication of the digital signature.

In an embodiment, the digital transaction is a blockchain transaction. A blockchain is a continuously growing distributed electronic ledger comprising blocks of data. Copies of the blockchain are maintained by peer devices in a peer-to-peer network typically consisting of thousands of peers and utilized by potentially millions of users that participate in transactions. Because a copy of the entire blockchain is maintained by each peer, no single centralized system is needed to maintain the records. Typically, each block in the blockchain is linked to a previous block such that altering one block consequently also requires altering the entire portion of the blockchain recorded after the altered block. Each block in a blockchain maintains digital transaction data related to one or more digital transactions, a timestamp indicating a time at which the block was validated, a cryptographic hash of its own content, and a cryptographic hash of the content of the previous block in the blockchain. A digital transaction represents an event occurring with respect to the blockchain such as, but not limited to, transfer of Bitcoin, recording of a transfer of a good, addition of an entry in a medical record, and the like. The linking of blocks is accomplished due to the presence of a hash of each previous block's contents in the next block in the blockchain. If a block is modified in an unauthorized manner, the hash of that block's contents is changed, thereby breaking the link with the next block in the blockchain. This ensures that the ledger is immutable and safe from manipulation by malicious entities. In blockchain transactions, a decentralized way is implemented such that that no single entity or group has control and rather, all users collectively retain control. Thus, decentralized blockchains transactions are immutable, i.e. the data entered is irreversible and that the blockchain transactions are permanently recorded and viewable to all participating entities.

Herein, an available node creates a partial signature for the transaction using its secret share and sends the partially signed transaction to a subsequent available node which augment the partially signed transaction with its own partial signature. In a 2-of-3 MPC scheme, such two partial signatures are sufficient to form a full signature and the last node sends the signed transaction back to the approval server or the like, which verifies it and forward it to the blockchain network. In a m-of-n MPC scheme, the partially signed transaction would be sent to the next available node and so on until at least 'm' nodes have applied their partial signatures, and the 'mth' node sends the signed transaction back to the approval server which verifies it and forward it to the blockchain network.

The present disclosure also provides a method for authenticating a digital transaction by implementing a multi-party computation protocol. The method comprises providing a first set of first nodes configured to generate a first data, wherein the first data comprises a secret share of a plurality of secret shares provided by each of the first nodes in the first set of first nodes, and wherein each of the first nodes, from the first set of first nodes, in a second set of first nodes is an independent party. Further, the method comprises providing a server arrangement communicably coupled with the first set of first nodes. Furthermore, the method comprises receiving, by the server arrangement, the first data from the first set of first nodes. Furthermore, the method comprises generating, by the server arrangement, a second data, wherein the second data comprises a secret share of the plurality of secret shares. Furthermore, the method comprises verifying, by the server arrangement, whether a number of other of the first nodes not in the second set of first nodes is equal to or at most only one greater than a number of first nodes in the second set of first nodes and authenticating, by the server arrangement, the digital transaction based on the verification, using the secret shares in the first data and the second data.

In an embodiment, the method further comprises providing a second node configured to generate a third data, wherein the third data comprises a secret share of the plurality of secret shares.

In an embodiment, the method further comprises authenticating, by the server arrangement, the digital transaction based on the verification, using the secret shares in the first data, the second data and the third data.

In another embodiment, in the method, the first set of first nodes comprises a single first node.

In an embodiment, in the method, when the server arrangement verifies that the number of other of the first nodes not in the second set of first nodes is at most one greater than the number of first nodes in the second set of first nodes, and the secret shares provided by the first nodes not in the second set of first nodes provides a different indication for authentication from the secret shares provided by the first nodes in the second set of first nodes, the method comprises authenticating, by the server arrangement, the digital transaction using the secret share in the second data.

In another embodiment, in the method, the secret share of the plurality of secret shares is a partial signature.

In an embodiment, in the method, the digital transaction is a blockchain transaction.

The present disclosure also provides a computer program product comprising a non-transitory computer-readable storage medium having computer program code stored thereon, the computer-readable instructions being executable by a computerized device comprising data processing hardware to execute the method for authenticating the digital transaction. Examples of implementation of the non-transitory computer-readable storage medium include, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

Typically, the benefit of using MPC for signing and securing crypto-asset transactions i.e. to cryptographically sign and secure blockchain transactions without ever creating private keys on any device or appliance eliminates the probability of private key theft. Moreover, aside from removing the risk of private key theft, the system or the method also provides a high level of security, availability and resilience attributed to unique distributed trust model. The present system and method employing the MPC protocol reduces the risk of data theft due to the inherent logic of the system making it more reliable and less prone to external attacks. Further, the present system and method eliminates the need for all participants or nodes to be present or stay online at the same time and thus reducing the time-dependence of the system. Currently, said coordination friction exists vastly in the marketplace and thus the system or method enables in reducing or saving significant amount of time and efforts to provide a competitive advantage over other existing systems and/or methods.

DETAILED DESCRIPTION OF THE DRAWINGS

Referring to FIG. 1, illustrated is a block diagram of a system 100 for authenticating a digital transaction by implementing a multi-party computation protocol, in accordance with an embodiment of the present disclosure. As shown, the system 100 comprises a first set of first nodes 102 configured to generate a first data 104, wherein the first data 104 comprises a secret share of a plurality of secret shares provided by each of the first nodes in the first set of first nodes 102. The system 100 also comprises a second set of first nodes 102A, wherein each of the first nodes in the second set of first nodes 102A is an independent party. The system 100 further comprises a server arrangement 106 communicably coupled with the first set of first nodes 102, wherein the server arrangement 106 is configured to receive the first data 104 from the first set of first nodes 102. Further, the server arrangement 106 is configured to generate a second data 108, wherein the second data 108 comprises a secret share of the plurality of secret shares. Furthermore, the server arrangement 106 is configured to verify whether a number of other of the first nodes 102B not in the second set of first nodes 102A is equal to or at most only one greater than a number of first nodes in the second set of first nodes 102A. Alternatively stated, the first set of first nodes 102 comprising the second set of first nodes 102A are independent parties whereas the other of the first nodes 102B, not present in the second set of first nodes 102A, are generally non-independent parties and in some cases, the other of the first nodes 102B may also be the independent parties. Herein, the server arrangement 106 verifies whether the number of other nodes 102B (i.e. the maximum number of possible non-independent parties) is equal to or at most one greater than the number of first nodes in the second set of first nodes 102A (i.e. the number of independent parties) to ensure that the system functions properly or is not compromised even if the there are no independent parties in the other nodes 102B involved in the multi-party computation protocol. Further, the server arrangement 106 is configured to authenticate the digital transaction based on the verification, using the secret shares in the first data 104 and the second data 106.

Figure 2:
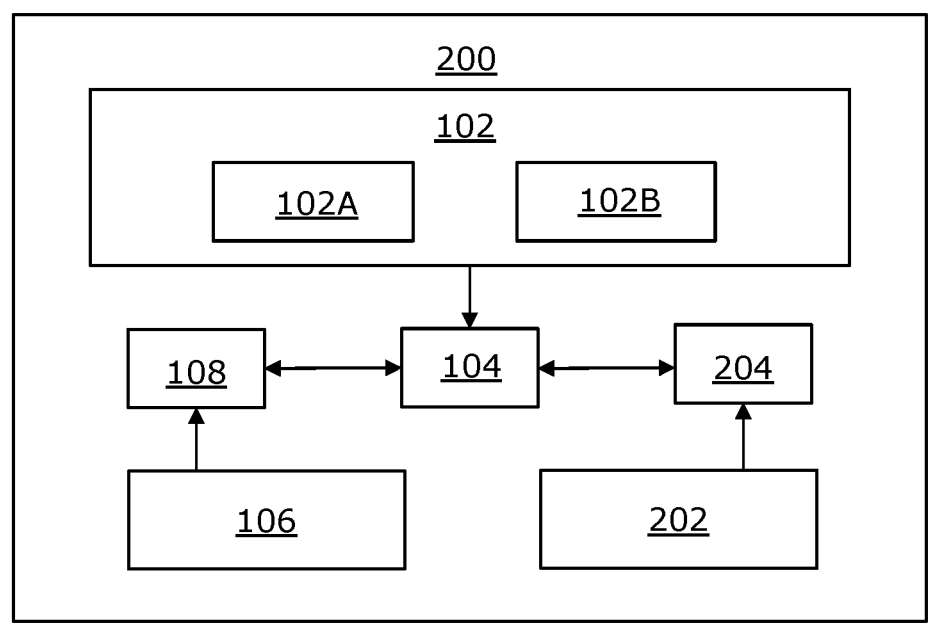
FIG. 2 is a block diagram of a system for authenticating a digital transaction by implementing a multi-party computation protocol, in accordance with another embodiment of the present disclosure.

Referring to FIG. 2, illustrated is a block diagram of a system 200 for authenticating a digital transaction by implementing a multi-party computation protocol, in accordance with another embodiment of the present disclosure. As shown, the system 200 comprises the first set of first nodes 102 configured to generate the first data 104. The system 200 also comprises a second set of first nodes 102A, wherein each of the first nodes in the second set of first nodes 102A is an independent party. The system 200 further comprises a server arrangement 106 communicably coupled with the first set of first nodes 102, wherein the server arrangement 106 is configured to receive the first data 104 from the first set of first nodes 102. Further, the server arrangement 106 is configured to generate a second data 108, wherein the second data 108 comprises a secret share of the plurality of secret shares. Furthermore, the system 200 comprises a second node 202 configured to generate a third data 204, wherein the third data 204 comprises a secret share of the plurality of secret shares and wherein the server arrangement 106 is configured to authenticate the digital transaction based on the verification, using the secret shares in the first data 104, the second data 108 and the third data 204.

Figure 3:
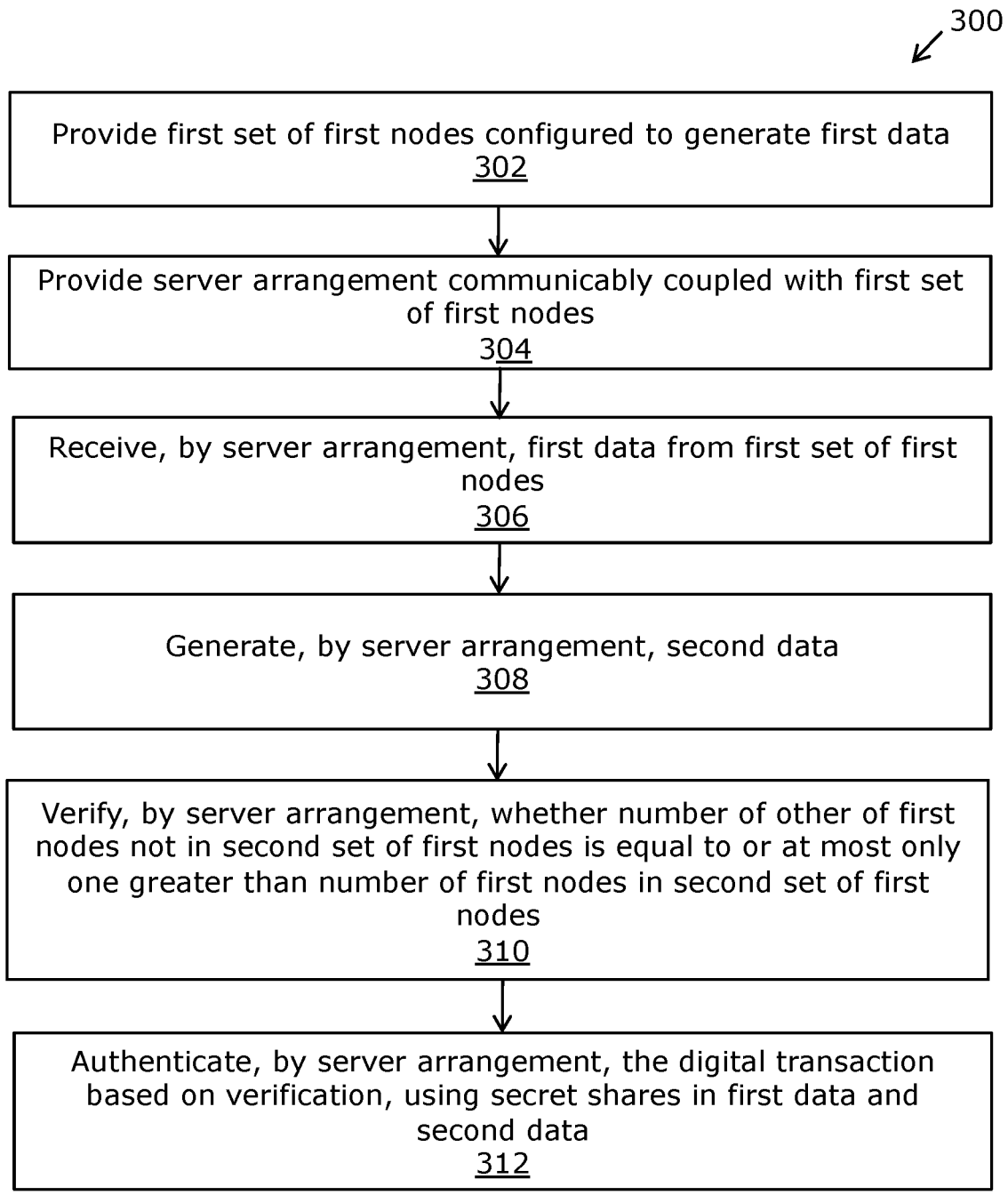
FIG. 3 is a flowchart of a method for authenticating a digital transaction by implementing a multi-party computation protocol, in accordance with an embodiment of the present disclosure.

Referring to FIG. 3, illustrated is a flowchart of a method 300 for authenticating a digital transaction by implementing a multi-party computation protocol, in accordance with an embodiment of the present disclosure. As shown, the method 300 comprises steps 302, 304, 306, 308, 310 and 312.

At step 302, the method 300 comprises providing a first set of first nodes configured to generate a first data, wherein the first data comprises a secret share of a plurality of secret shares provided by each of the first nodes in the first set of first nodes, and wherein each of the first nodes, from the first set of first nodes, in a second set of first nodes is an independent party.

At step 304, the method 300 comprises providing a server arrangement communicably coupled with the first set of first nodes. The server arrangement communicably coupled with the first set of first nodes is provided to perform further steps of the method 300.

At step 306, the method 300 comprises receiving, by the server arrangement, the first data from the first set of first nodes. Upon generation of the first data by the first set of first nodes, the server arrangement is configured to receive the first data comprising the secret share from the first set of first nodes for further operation.

At step 308, the method 300 comprises generating, by the server arrangement, a second data, wherein the second data comprises a secret share of the plurality of secret shares. Upon receiving the first data corresponding to the first set of first nodes, the server arrangement is configured to generate the second data comprising the secret share of the plurality of secret shares (different from the first data) corresponding to the server arrangement for authenticating the digital transaction.

At step 310, the method 300 comprises verifying, by the server arrangement, whether a number of other of the first nodes not in the second set of first nodes is equal to or at most only one greater than a number of first nodes in the second set of first nodes. Upon generating the second data, the server arrangement is configured to verify whether the number of other of the first nodes not in the second set of first nodes is equal to or at most only one greater than the number of first nodes in the second set of first nodes. Alternatively stated, the server arrangement verifies whether the number of dependent parties involved in the MPC protocol is equal to or at most only one greater than the number of independent parties, such that the system is not vulnerable to compromise by a single participating node or entity and the authentication of the digital transaction is secure and reliable.

At step 312, the method 300 comprises authenticating, by the server arrangement, the digital transaction based on the verification, using the secret shares in the first data and the second data. Upon successful verification, the server arrangement is configured to authenticate the digital transaction by combining and using the secret shares in the first data and the second data.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for authenticating a digital transaction by implementing a multi-party computation protocol, the system comprising:
   a first set of first nodes configured to generate a first data, wherein the first data comprises a secret share of a plurality of secret shares provided by each of the first nodes in the first set of first nodes, and wherein each of the first nodes, from the first set of first nodes, in a second set of first nodes is an independent party;
   a second node configured to generate a third data, wherein the second node is a customer node requesting authentication of the digital transaction, and wherein the third data comprises a secret share of the plurality of secret shares; and
   a server arrangement communicably coupled with the first set of first nodes, wherein the server arrangement is configured to:
   receive the first data from the first set of first nodes;
   generate a second data, wherein the second data comprises a secret share of the plurality of secret shares and is a partial signature;
   verify whether a number of other of the first nodes not in the second set of first nodes is equal to or at most only one greater than a number of first nodes in the second set of first nodes; and
   authenticate the digital transaction based on the verification, using the secret shares in the first data, the second data and the third data.

2. A system according to claim 1, wherein the server arrangement is configured to authenticate the digital transaction based on the verification, using the secret shares in the first data, the second data and the third data.

3. A system according to claim 1, wherein the first set of first nodes comprises a single first node.

4. A system according to claim 1, wherein when the server arrangement verifies that the number of other of the first nodes not in the second set of first nodes is at most one greater than the number of first nodes in the second set of first nodes, and the secret shares provided by the other of the first nodes not in the second set of first nodes provides a different indication for authentication from the secret shares provided by the first nodes in the second set of first nodes, the server arrangement is configured to authenticate the digital transaction using the secret share in the second data.

5. A system according to claim 1, wherein the digital transaction is a blockchain transaction.

6. A method for authenticating a digital transaction by implementing a multi-party computation protocol, the method comprising:

providing a first set of first nodes configured to generate a first data, wherein the first data comprises a secret share of a plurality of secret shares provided by each of the first nodes in the first set of first nodes, and wherein each of the first nodes, from the first set of first nodes, in a second set of first nodes is an independent party;
providing a second node configured to generate a third data, wherein the second node is a customer node requesting authentication of the digital transaction, and wherein the third data comprises a secret share of the plurality of secret shares; and
providing a server arrangement communicably coupled with the first set of first nodes;
receiving, by the server arrangement, the first data from the first set of first nodes;
generating, by the server arrangement, a second data, wherein the second data comprises a secret share of the plurality of secret shares and is a partial signature;
verifying, by the server arrangement, whether a number of other of the first nodes not in the second set of first nodes is equal to or at most only one greater than a number of first nodes in the second set of first nodes; and
authenticating, by the server arrangement, the digital transaction based on the verification, using the secret shares in the first data, the second data and the third data.

7. A method according to claim 6, further comprising authenticating, by the server arrangement, the digital transaction based on the verification, using the secret shares in the first data, the second data and the third data.

8. A method according to claim 6, wherein the first set of first nodes comprises a single first node.

9. A method according to claim 6, wherein when the server arrangement verifies that the number of other of the first nodes not in the second set of first nodes is at most one greater than the number of first nodes in the second set of first nodes, and the secret shares provided by the other of the first nodes not in the second set of first nodes provides a different indication for authentication from the secret shares provided by the first nodes in the second set of first nodes, the method comprises authenticating, by the server arrangement, the digital transaction using the secret share in the second data.

10. A method according to claim 6, wherein the digital transaction is a blockchain transaction.

11. A computer program product comprising a non-transitory computer-readable storage medium having computer-readable instructions stored thereon, the computer-readable instructions being executable by a computerized device comprising data processing hardware to execute a method as claimed in claim 6.

* * * * *